United States Patent
Orsing

[11] 3,910,250
[45] Oct. 7, 1975

[54] GRILL FOR BROILING MEAT, FISH, VEGETABLES

[76] Inventor: John Harry Orsing, Avangsgatan 2, 253 71 Helsingborg, Sweden

[22] Filed: June 18, 1974

[21] Appl. No.: 480,477

[30] Foreign Application Priority Data
June 19, 1973 Sweden............................ 7308594

[52] U.S. Cl................................................ 126/9 A
[51] Int. Cl.² ................. F24C 01/16; F24B 03/00; A47J 37/07
[58] Field of Search ............... 126/9, 25; 44/38, 40; 211/153, 181; 220/19; 99/449, 450

[56] References Cited
UNITED STATES PATENTS

| | | | |
|---|---|---|---|
| 2,236,992 | 4/1941 | Broadley............................ | 126/9 A |
| 2,965,096 | 12/1960 | Barton................................ | 126/9 A |
| 3,353,527 | 11/1967 | Anderson.......................... | 126/9 A X |
| 3,491,743 | 1/1970 | Temp.................................. | 126/9 A |

FOREIGN PATENTS OR APPLICATIONS

| | | | |
|---|---|---|---|
| 29,318 | 4/1884 | Germany............................ | 99/449 |

Primary Examiner—Carroll B. Dority, Jr.
Assistant Examiner—Harold Joyce
Attorney, Agent, or Firm—Malcolm W. Fraser, Esq.

[57] ABSTRACT

A grill comprises a tray and a grate covering the tray. The grate consists of intercrossing wires portions of which are cut off from the rest of the grate and bent down into the tray to form forks for retaining a fuel cartridge supported edgewise on the bottom of the tray.

1 Claim, 2 Drawing Figures

GRILL FOR BROILING MEAT, FISH, VEGETABLES

The invention relates to a grill for broiling meat, fish, vegetables, etc. over a fire, comprising a metal tray preferably an aluminum tray, and a grate covering said tray.

There is an expressed want of a grill which contains the necessary fuel in a suitable form and thus is completely ready for use and which is so cheap that one can very well afford to throw it away after use and thus be spared from the cumbersome cleaning of the grill which otherwise has to be done each time a grill has been in use.

The principal purpose of the invention is to satisfy this want, and according to the invention there is provided a grill of the type referred to comprising a metal tray, a grate covering said tray, which comprises first and second wires crossing each other and interconnected at the crossings, and at least one retainer formed by portions of at least one of said first wires on opposite sides of at least one of said second wires, said portions being cut off from the rest of the grate and being bent down into the tray to support a fuel cartridge resting on the bottom of the tray in an edgewise position.

Figure 1:
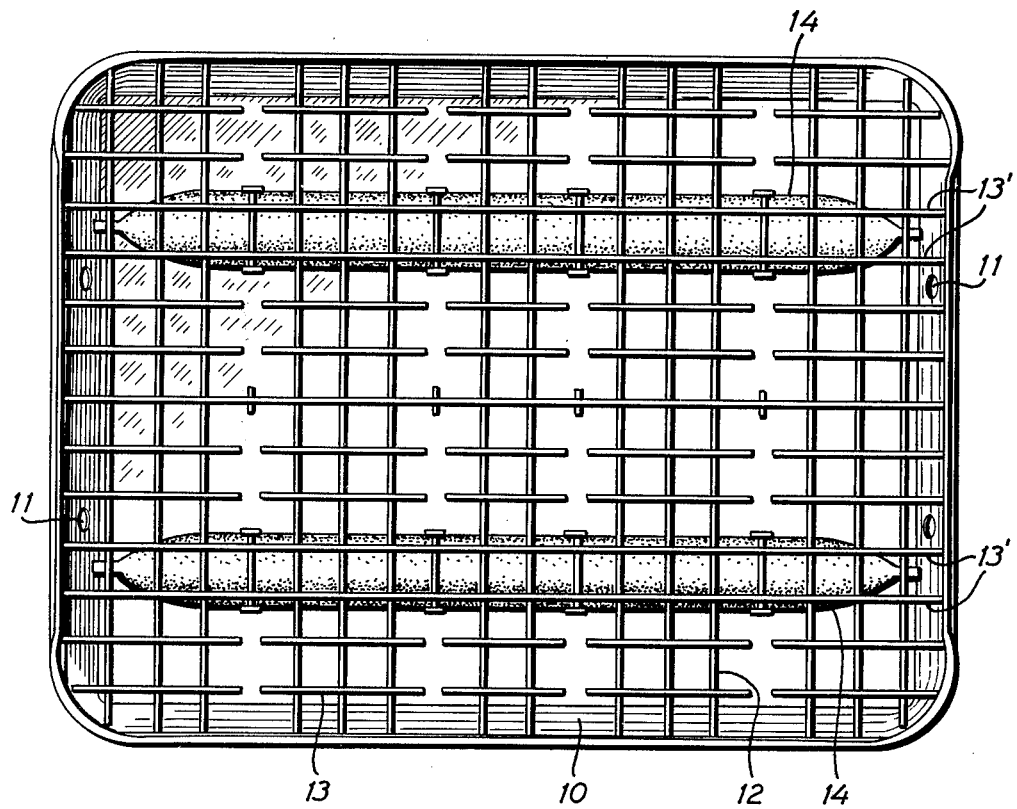
Figure 2:
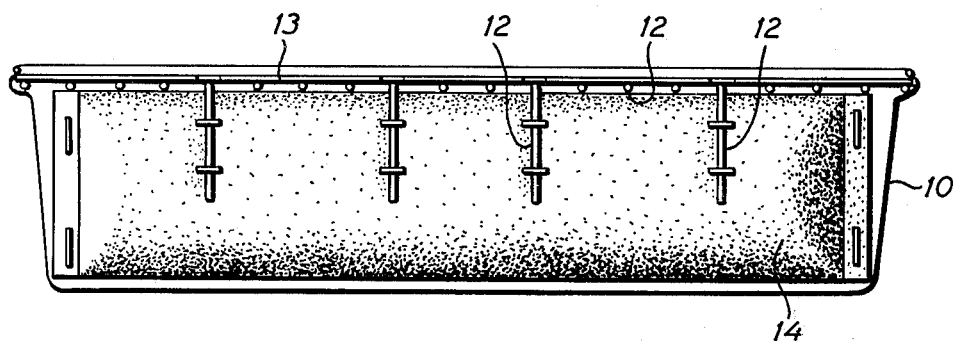

The invention will be described in more detail below with reference to the drawing in which FIG. 1 is a plan view of a grill according to the invention; and FIG. 2 is a longitudinal cross sectional view of the grill shown in FIG. 1.

The grill shown in the drawing comprises a rectangular tray 10 of thin aluminum sheet forming a flat bottom. Air supply openings 11 are provided in the side wall of the tray. The tray is covered by a wire grate of the type having interparallel first wires 12 and interparallel second wires 13 crossing wires 12 and connected thereto by welding in the crossings. This grate is connected with the tray at the marginal portion of the side wall thereof said portion being folded around the grate at the edge thereof along the entire periphery of the grate. Predetermined first wires 12' at each side of predetermined second wires 13' are cut off from the rest of the wires, and the wire portions thus detached are bent down into tray 10 in pairs to form a number of forks adapted to hold a fuel cartridge of the type disclosed in my U.S. Pat. No. 3,651,596 edgewise on the bottom of tray 10. In the embodiment disclosed in the drawing two rows of forks are provided to hold two interparallel fuel cartridges mutually spaced which extend substantially over the total length of the tray. These cartridges are ignited in the position shown by using an ignition liquid of a conventional type and are retained by the forks in said position during the burning the fuel when burning as well as the residue of the fuel when burnt being kept within the covering of the cartridge.

The grill described is well suited as a one-way grill and has been constructed to be used as a grill of this type. However, it is possible to replace the burnt fuel cartridges and to use the grill again after cleaning of the grate, since the fuel cartridges are easily replaceable.

A single fuel cartridge or several fuel cartridges may be provided in the grill in another arrangement than that disclosed here the principles according to the invention still being applied. It is not necessary to arrange wire portions 12' in pairs in order to form forks; these portions may be arranged in stagger along the fuel cartridge.

What I claim is:

1. In combination with a metal broiling tray having a bottom wall and side walls, a grate covering said tray for supporting food to be broiled above said bottom wall, said tray comprising first and second wires crossing each other and connected at the points of crossing, and retainers adapted to support a fuel cartridge, said retainers constituting downwardly extending sections of said first wires selected in laterally spaced pairs on opposite sides of an adjacent pair of said second wires, thereby to provide parallel forks for embracing and holding a fuel cartridge therebetween.

* * * * *